(12) United States Patent
Gupta

(10) Patent No.: US 9,194,995 B2
(45) Date of Patent: Nov. 24, 2015

(54) COMPACT ILLUMINATION MODULE FOR HEAD MOUNTED DISPLAY

(75) Inventor: Anurag Gupta, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 988 days.

(21) Appl. No.: 13/313,926

(22) Filed: Dec. 7, 2011

(65) Prior Publication Data

US 2013/0147685 A1 Jun. 13, 2013

(51) Int. Cl.
*F21V 8/00* (2006.01)
*G02B 5/02* (2006.01)
*G02B 27/01* (2006.01)

(52) U.S. Cl.
CPC .............. *G02B 6/0068* (2013.01); *G02B 5/02* (2013.01); *G02B 6/0028* (2013.01); *G02B 6/0055* (2013.01); *G02B 27/0172* (2013.01); *G02B 2027/0118* (2013.01)

(58) Field of Classification Search
CPC .......................... G02B 27/017; G02B 27/0172
See application file for complete search history.

(56) References Cited

U.S. PATENT DOCUMENTS

| | | | |
|---|---|---|---|
| 4,711,512 A | 12/1987 | Upatnieks | |
| 5,076,664 A | 12/1991 | Migozzi | |
| 5,093,567 A | 3/1992 | Staveley | |
| 5,539,422 A | 7/1996 | Heacock et al. | |
| 5,696,521 A | 12/1997 | Robinson et al. | |
| 5,715,337 A | 2/1998 | Spitzer et al. | |
| 5,771,124 A | 6/1998 | Kintz et al. | |
| 5,815,126 A | 9/1998 | Fan et al. | |
| 5,844,530 A | 12/1998 | Tosaki | |
| 5,886,822 A | 3/1999 | Spitzer | |
| 5,896,232 A | 4/1999 | Budd et al. | |
| 5,926,318 A | 7/1999 | Hebert | |
| 5,943,171 A | 8/1999 | Budd et al. | |
| 5,949,583 A | 9/1999 | Rallison et al. | |

(Continued)

FOREIGN PATENT DOCUMENTS

| | | |
|---|---|---|
| CN | 101137706 A | 3/2008 |
| EP | 2 151 623 | 2/2010 |

(Continued)

OTHER PUBLICATIONS

EP Application No. 12855627.1, EPO extended European search report and European search opinion, mailed Jul. 1, 2015, 7 pages.

(Continued)

*Primary Examiner* — Ricardo L Osorio
(74) *Attorney, Agent, or Firm* — Blakely Sokoloff Taylor & Zafman LLP

(57) ABSTRACT

An illumination module includes a light source to output lamp light and a mixing light guide having a substantially rectangular cross-section. The mixing light guide includes a spatial homogenization section and an emission section. The spatial homogenization section includes a first end coupled to receive the lamp light having a first cross-section profile from the light source and a second end to deliver the lamp light with a second cross-section profile substantially conforming to the substantially rectangular cross-section of the mixing light guide. The emission section is adjacent to the second end. The emission section includes an emission surface through which the lamp light is emitted with a substantially uniform intensity profile. The emission surface faces a different direction than an input surface of the first end through which the lamp light is received into the mixing light guide.

29 Claims, 6 Drawing Sheets

(56) References Cited

U.S. PATENT DOCUMENTS

| | | | |
|---|---|---|---|
| 6,023,372 A | 2/2000 | Spitzer et al. |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,547,400 B1 * | 4/2003 | Yokoyama ............ G03B 21/208 353/122 |
| | | | 345/39 |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 7,158,096 B1 | 1/2007 | Spitzer |
| 7,242,527 B2 | 7/2007 | Spitzer et al. |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,594,743 B2 | 9/2009 | Kimura et al. |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,843,403 B2 | 11/2010 | Spitzer |
| 7,900,068 B2 | 3/2011 | Weststrate et al. |
| 7,959,308 B2 | 6/2011 | Freeman et al. |
| 8,004,765 B2 | 8/2011 | Amitai |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2007/0035707 A1 * | 2/2007 | Margulis ............... G03B 21/00 353/122 |
| 2008/0212195 A1 | 9/2008 | Yamamoto |
| 2008/0219025 A1 | 9/2008 | Spitzer et al. |
| 2008/0266863 A1 | 10/2008 | Rinko |
| 2009/0122414 A1 | 5/2009 | Amitai |
| 2009/0251788 A1 | 10/2009 | DeJong et al. |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2011/0128469 A1 | 6/2011 | Wang |
| 2011/0213664 A1 | 9/2011 | Osterhout et al. |

FOREIGN PATENT DOCUMENTS

| | | |
|---|---|---|
| GB | 2272980 A | 6/1994 |
| WO | WO96/05533 A1 | 2/1996 |
| WO | WO 2006/099375 A1 | 9/2006 |

OTHER PUBLICATIONS

PCT/US2012/062293; PCT International Preliminary Report on Patentability, mailed Jun. 19, 2014, 8 pages.

Levola, Tapani, "Diffractive Optics for Virtual Reality Displays", Academic Dissertation, Joensuu 2005, University of Joensuu, Department of Physics, Vaisala Laboratory, 26 pages.

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

Vikuiti Product Tutorials: Vikuiti Display Enhancement Films, <http://solutions.3m.com/wps/portal/3M/en_US/Vikuiti1/BrandProducts/secondary/vikuititutorials/> Retrieved from Internet on Oct. 13, 2011, 1 page, 3M Company.

PCT/US2012/062293; PCT International Search Report and Written Opinion of the International Searching Authority, mailed Feb. 28, 2013, 9 pages.

CN 20120059229.1—First Office Action, issued Sep. 9, 2015, 13 pages.

* cited by examiner

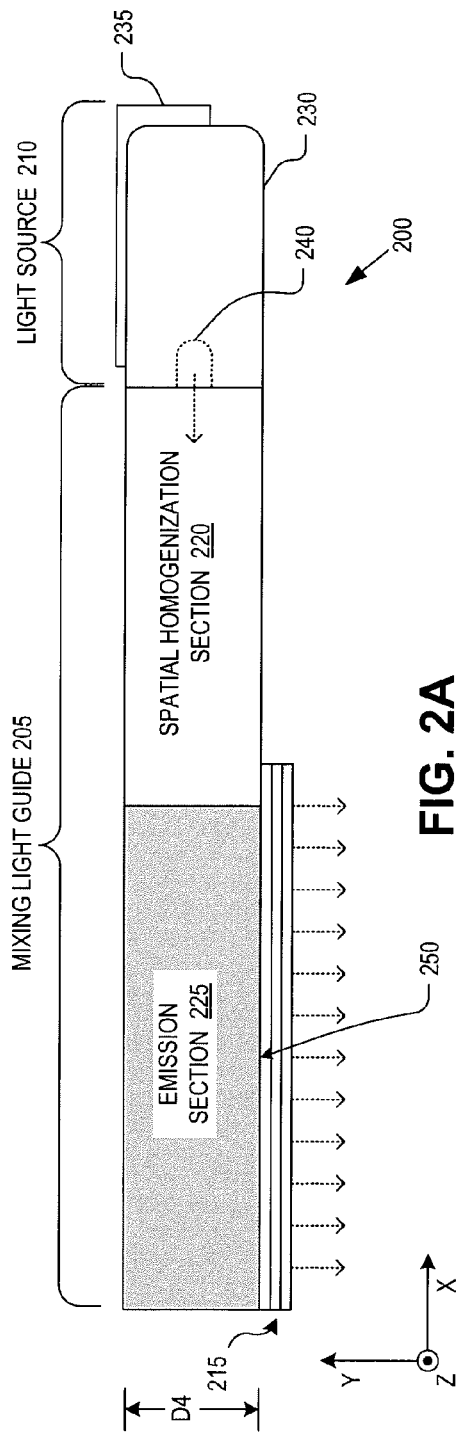
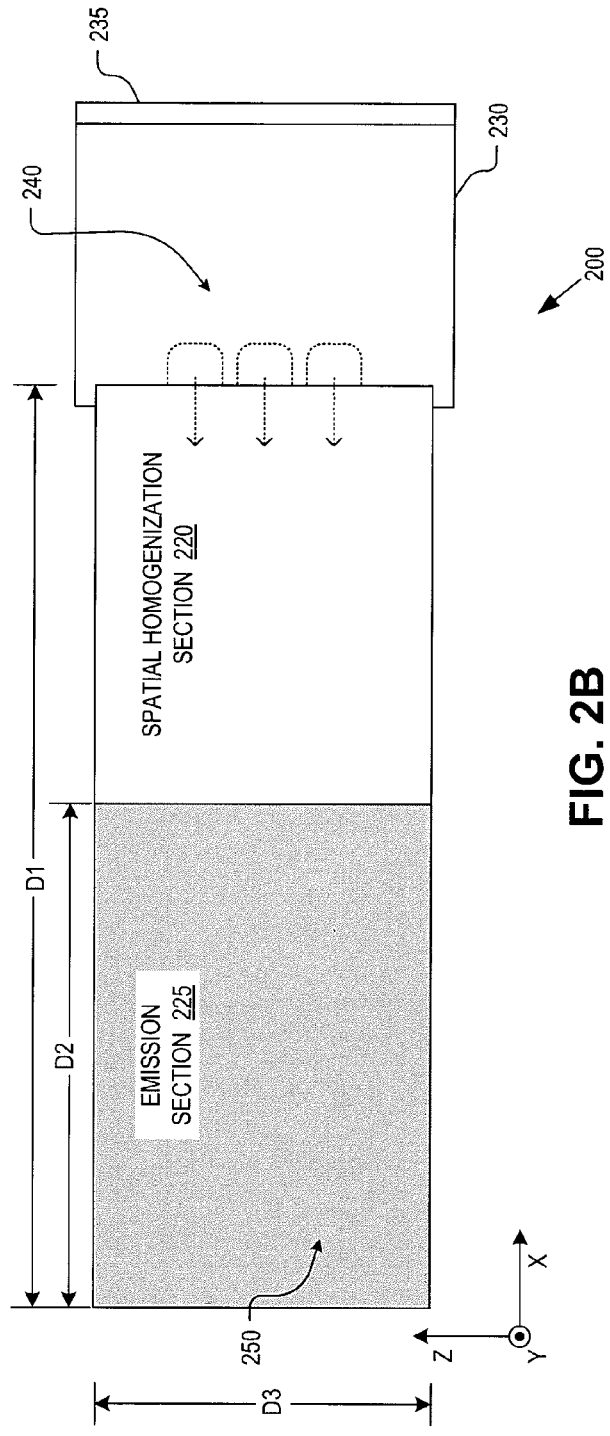
FIG. 2A
FIG. 2B

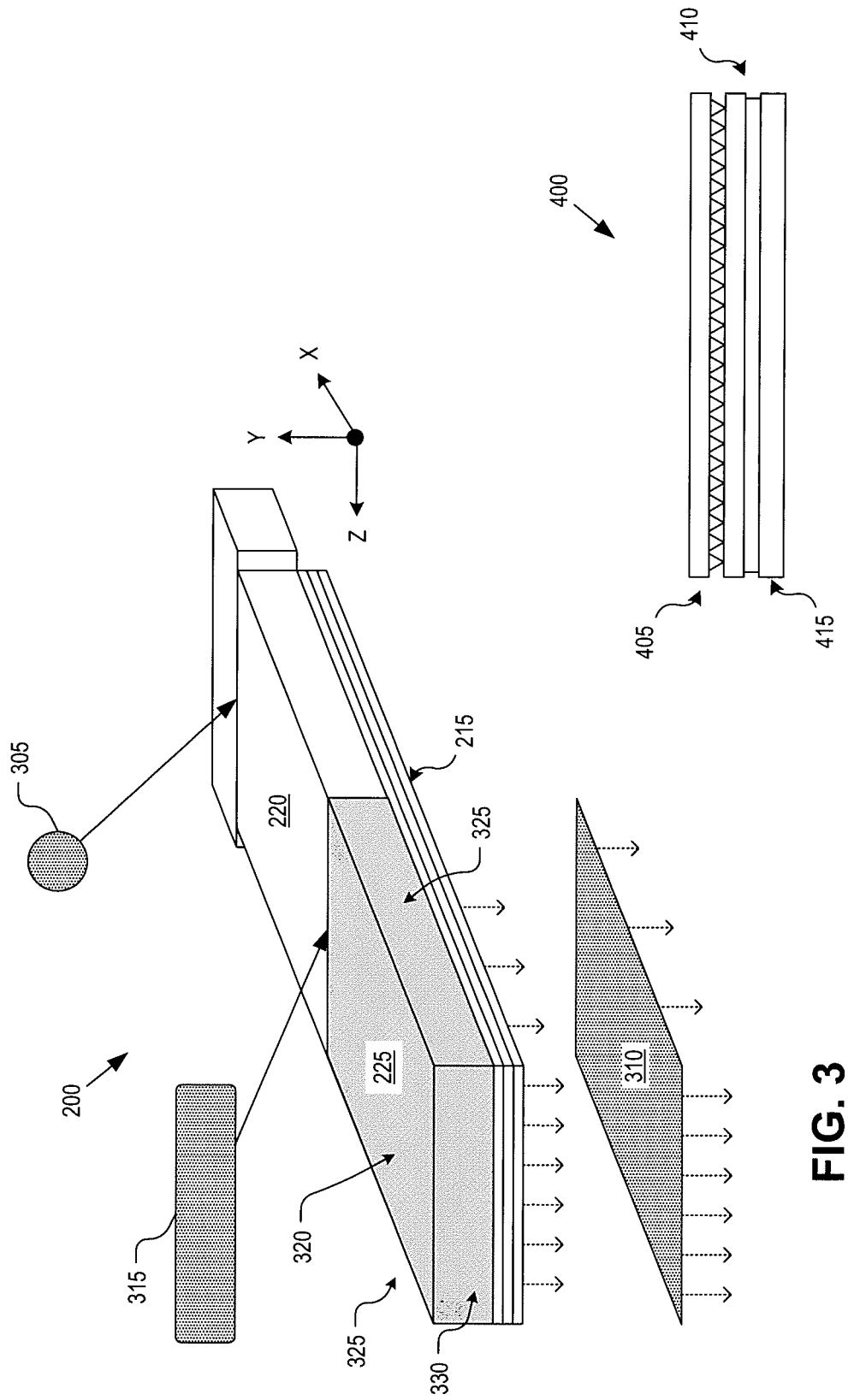

COMPACT ILLUMINATION MODULE FOR HEAD MOUNTED DISPLAY

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily drawn to scale.

FIG. 2A is a cross-sectional side view an illumination module, in accordance with an embodiment of the disclosure.

FIG. 2B is a cross-sectional bottom view an illumination module, in accordance with an embodiment of the disclosure.

FIG. 3 is a perspective view of an illumination module, in accordance with an embodiment of the disclosure.

FIG. 4 is a cross-sectional view of a light enhancement sandwich structure, in accordance with an embodiment of the disclosure.

DETAILED DESCRIPTION

Embodiments of an apparatus and method of operation of a head mounted display including an illumination module with mixing light guide are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
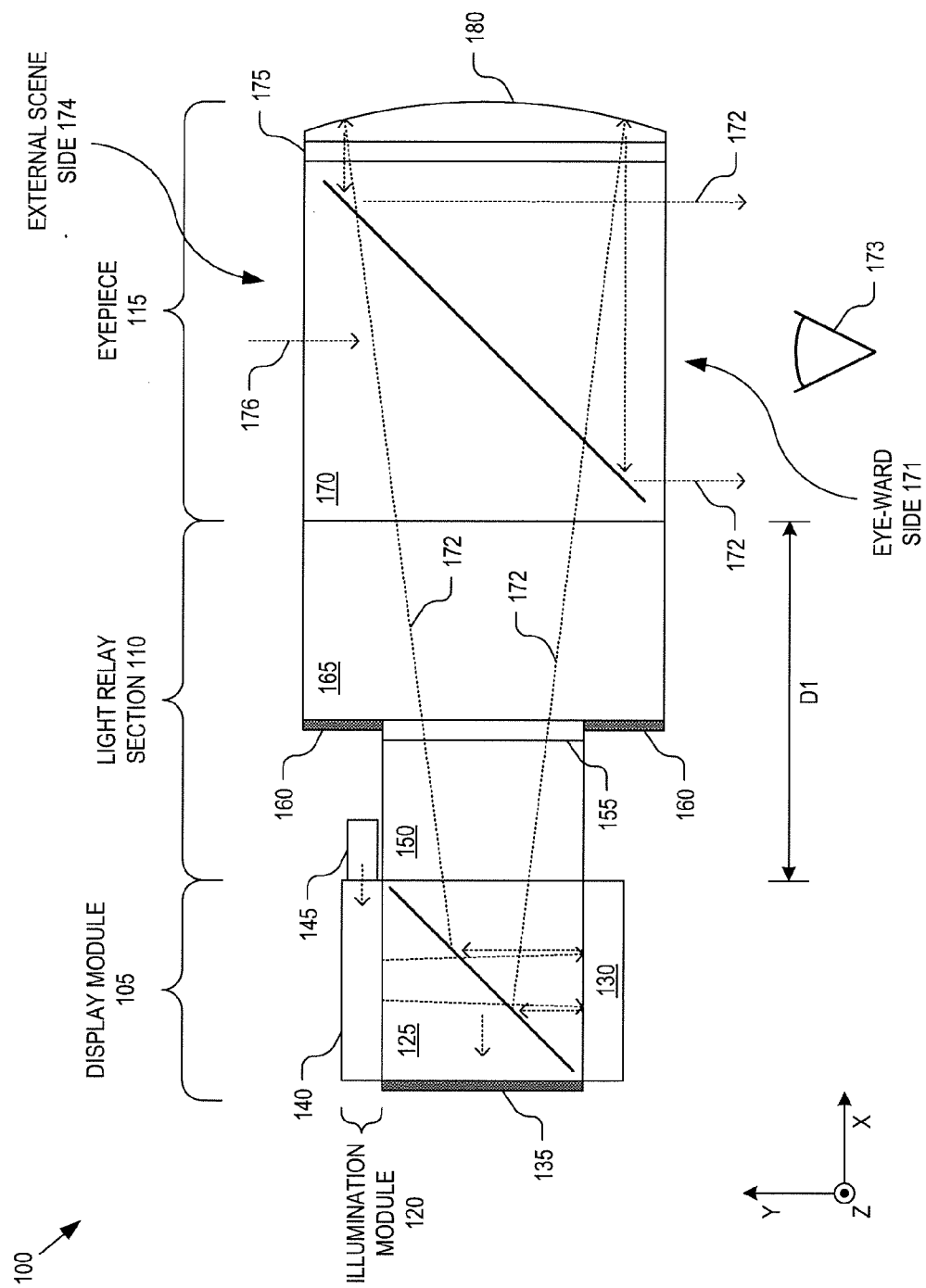
FIG. 1 is a cross-sectional view of a near-to-eye display, in accordance with an embodiment of the disclosure.

FIG. 1 is a cross-sectional view of a near-to-eye display 100, in accordance with an embodiment of the disclosure. The illustrated embodiment of near-to-eye display 100 includes a display module 105, a light relay section 110, and an eyepiece 115. The illustrated embodiment of display module 105 includes an illumination module 120, a beam splitter 125, a display panel 130, and a light absorbing coating 135. Illumination module 120 includes a mixing light guide 140 and a light source 145. The illustrated embodiment of light relay 110 includes small section 150, half-wave plate polarization rotator 155, light blocks 160, and large section 165. The illustrated embodiment of eyepiece 115 is a see-through eyepiece with a beam splitter 170, a quarter-wave plate polarization rotator 175, and end reflector 180. Eyepiece 115 includes an eye-ward side 171 for emission of computer generated image ("CGI") light 172 towards eye 173 and an external scene side 174 through which ambient scene light 176 enters.

Illumination module 120 generates lamp light used to illuminate display panel 130, which modules image data onto the lamp light to create CGI light 172. To provide a good quality, uniform image, the lamp light should illuminate display panel 130 with sufficiently uniform intensity. Illumination module 120 is well suited for use with near-to-eye displays and head mounted displays, since it is compact and efficient.

The lamp light generated by illumination module 120 is emitted from an emission surface into beam splitter 125. In one embodiment, beam splitter 125 is a polarizing beam splitter ("PBS") cube that substantially passes light of a first polarization (e.g., P polarization), while substantially reflecting light of a second polarization (e.g., S polarization). These two polarization components are typically orthogonal linear polarizations. The emitted light may be pre-polarized (e.g., P polarized) or unpolarized light. In either event, the P polarization component passes through the PBS cube to illuminate display panel 130 while most of any remaining portions of S polarization are reflected back onto light absorbing coating 135 (e.g., flat black paint). Thus, in the illustrated embodiment, display panel 130 is mounted in opposition to illumination module 120 with beam splitter 120 disposed in between.

Display panel 130 (e.g., liquid crystal on silicon panel, digital micro-mirror display, etc.) imparts image data onto the lamp light via selective reflection by an array of reflective pixels. In an embodiment using an LCOS panel, reflection by display panel 130 rotates the polarization of the incident lamp light by 90 degrees. Upon reflection of the incident lamp light, the CGI light (which has been rotated in polarization by 90 degrees to be, for example, S polarized) is re-directed by beam splitter 125 and propagates down light relay 110 along a forward propagation path towards eyepiece 115. In an embodiment using a digital micro-minor display, beam splitter 125 may be implemented as a standard 50/50 beam splitter and the CGI light 172 may be unpolarized light. Since beam splitter 125 operates to launch the CGI light into light relay 110 and eyepiece 115, it may be referred to as an in-coupling beam splitter or in-coupling PBS.

In one embodiment, CGI light 172 is directed along the forward propagation path within light relay 110 without need of total internal reflection ("TIR"). In other words, the cross sectional shape and divergence of the light cone formed by CGI light 172 is confined such that the light rays reach end reflector 180 without need of TIR off the sides of light relay 110 or eyepiece 115.

Beam splitter 125, light relay 110, and beam splitter 170 may be fabricated of a number of materials including glass, optical grade plastic, fused silica, PMMA, Zeonex-E48R, or otherwise. The length D1 of light relay 110 may be selected based upon the temple-eye separation of the average adult and such that the focal plane of end reflector 180 substantially coincides with an emission aperture of display panel 130. To achieve focal plane alignment with the emission aperture of display panel 130, both the length of light relay 110 and the radius of curvature of end reflector 180 may be selected in connection with each other.

In the illustrated embodiment, light relay 110 includes half-wave plate polarization rotator 155 disposed at the interface between small section 150 and large section 165. Half-wave plate polarization rotator 155 servers to rotate the polarization of CGI light 172 by 90 degrees (e.g., convert the S polarized light back to P polarized light again). The illustrated embodiment of light relay 110 further includes light blocks 160 disposed on the edges of large section 165 that extend past small section 150. Light blocks 160 reduce external light from leaking into light relay 110 and eyepiece 115. Light blocks 160 may be opaque paint, a opaque collar extending around small section 150, or otherwise.

The illustrated embodiment of eyepiece 115 includes a partially reflective surface formed within beam splitter 170. In one embodiment, beam splitter 170 is partially transparent, which permits external (ambient) scene light 176 to pass through external scene side 174 and eye-ward side 171 of eyepiece 115 to reach eye 173. A partially transparent embodiment facilitates an augmented reality ("AR") where CGI light 172 is superimposed over external scene light 176 to the user eye 173. In another embodiment, eyepiece 115 is substantially opaque (or even selectively opaque), which facilitates a virtual reality ("VR") that immerses the user in the virtual environment displayed by CGI light 172.

In the illustrated embodiment, beam splitter 170 is an out-coupling PBS cube configured to pass one linear polarization (e.g., P polarization), while reflecting the other linear polarization (e.g., S polarization). Thus, the out-coupling PBS passes CGI light 172 propagating along the forward propagation path to quarter wave-plate polarization rotator 175.

After passing through quarter-wave plate polarization rotator 175, CGI light 172 is reflected back along a reverse propagation path back towards the out-coupling PBS. Thus, CGI light 172 is rotated a total of 90 degree in polarization during its double pass through quarter-wave plate polarization rotator 175 and is S polarized by the time it strikes the out-coupling PBS on the reverse propagation path.

In one embodiment, end reflector 180, both reflects and collimates CGI light 172 such that CGI light 172 traveling along the reverse propagation path is substantially collimated. As previously stated, the focal plane of end reflector 180 may be configured to coincide or nearly coincide with the emission aperture of display panel 130. Collimating (or nearly collimating) CGI light 172 helps eye 173 to focus on CGI light 172 emitted out eye-ward side 171 in a near-to-eye configuration (e.g., eyepiece 115 placed within 10 cm of eye 173 and typically less than 5 cm of eye 173). CGI light 172 is directed towards eye 173 due to the oblique orientation (e.g., approximately 45 degrees relative to sides 174 and 171) of the out-coupling PBS. In other embodiments, end reflector 180 merely reduces the divergence of CGI light 172 without fully collimating CGI light 172. In yet other embodiments, end reflector 180 may be implemented as a flat reflective surface. In embodiments where in-coupling beam splitter 125 and out-coupling beam-splitter 170 are regular beam splitters, half-wave plate polarization rotator 155 and quarter-wave plate polarization rotator 175 may be omitted.

FIGS. 2A, 2B, and 3 illustrate an illumination module 200, in accordance with an embodiment of the disclosure. FIG. 2A is a cross-sectional side view, FIG. 2B is a cross-sectional bottom view, and FIG. 3 is a perspective view of illumination module 200. Illumination module 200 represents one possible implementation of illumination module 120 illustrated in FIG. 1. The illustrated embodiment of illumination module 200 includes a mixing light guide 205, a light source 210, and a light enhancement sandwich structure 215. The illustrated embodiment of mixing light guide 205 includes a spatial homogenization section 220 and an emission section 225. The illustrated embodiment of light source 210 includes a housing 230, a light shield 235, and lamp 240.

Illumination module 200 is a compact, high efficiency, uniform lamp light source for illuminating display 130. In the illustrated embodiment, mixing light guide 205 is a single, continuous piece, solid optical waveguide that receives lamp light having a first cross-section profile 305 (see FIG. 3) from lamp 240 and outputs the lamp light from an emission surface 250 having a substantially uniform intensity profile 310. Mixing light guide 205 may be fabricated of optical plastic (e.g., PMMA, Zeonex—E48R) or other optical materials (e.g., glass, fused silica, quartz, etc.). Example dimensions for mixing light guide 205 include D1=10 mm, D2=6 mm, D3=4 mm, and D4=1 mm. Of course, other dimensions may be implemented.

Light source 210 launches lamp light into mixing light guide 205. The illustrated embodiment of light source 210 includes lamp 240 disposed within a housing 230. Housing 230 is at least partially covered over by light shield 235. Lamp 240 may be implemented as a single white light source (e.g., white LED, white phosphorus LED, etc.). In this embodiment, if display module 105 is intended to be color display, then a color filter array ("CFA") may be coated over display panel 130. In one embodiment, lamp 240 is a tricolor lamp that includes three color LEDs (e.g., RGB LEDs) that cycle to produce a full color display without need of a CFA.

Spatial homogenization section 220 inputs the lamp light with cross-section profile 305 at a first end and spreads the lamp light out to have a second cross-section profile 315 at its opposite end that substantially conforms to the rectangular cross-section of mixing light guide 205. Spatial homogenization section 220 performs the light spreading function via a series of internal reflections off of its exterior surfaces as the lamp light propagates towards emission section 225. In one embodiment, total internal reflection ("TIR") is responsible for the surface reflections. In one embodiment, spatial homogenization section 220 may be lined with a reflective coating.

Emission section 225 is defined by the presence of a pattern disposed in or on one or more surfaces of a portion of mixing light guide 205. For example, in the embodiment illustrated in FIG. 3, four surfaces including top surface 320, two edge surfaces 325, and end surface 330 are covered with a pattern. The pattern operates to alter the reflective properties of the surfaces of emission section 225, such that the lamp light begins to exit through emission surface 250. For example, in one embodiment, top surface 320 and optionally one or more of edge surfaces 325 and end surface 330 are coated with a reflective coating having light scattering properties (e.g., diffusive white paint). The reflective light scattering properties change the angle of incident of the lamp light when it strikes emission surface 250 thereby defeating TIR in emission section 225 at emission surface 250. As such, the lamp light begins to exit out emission surface 250. Because the light scattering coating is reflective, the lamp light only emerges from emission surface 225. As discussed below in connection with FIGS. 5A-5D, various different types of patterns, as opposed to a solid uniform pattern (e.g., white diffusive paint), may be disposed on emission surface 250 and top surface 320 to further control how lamp light is emitted from emission section 225. In the illustrated embodiment, emission surface 250 is substantially orthogonal to cross-section profiles 305 and 315.

The illustrated embodiment of illumination module 200 includes light enhancement sandwich structure 215 disposed over emission surface 250. Light enhancement sandwich structure 215 operates to reduce the divergence of the lamp light emitted from emission section 225 and, in some embodiments, polarize or substantially polarize the emitted lamp light. FIG. 4 is a cross-sectional view of a light enhancement sandwich structure 400, in accordance with an embodiment of the disclosure. Light enhancement sandwich structure 400 is one possible implementation of light enhancement sandwich structure 215. The illustrated embodiment of light enhancement sandwich structure 400 includes a first brightness enhancement film ("BEF") 405, a second BEF 410, and a reflective polarizing layer 415. BEFs 405 and 410 may be implemented as thin layers have prismatic structures disposed thereon. The prismatic structures in each BEF operate to reduce light divergence along a single dimension. By layering two BEFs 405 and 410 substantially orthogonal to each other, the divergence of the emitted light cone can be reduced in both dimensions. Reflective polarizing layer 415 may be added to substantially linearly polarize the lamp light emitted from emission surface 250. In one embodiment, layers 405, 410, and 415 are held together using mechanical friction via clamping illumination module 200 to beam splitter 125.

Figure 5A:
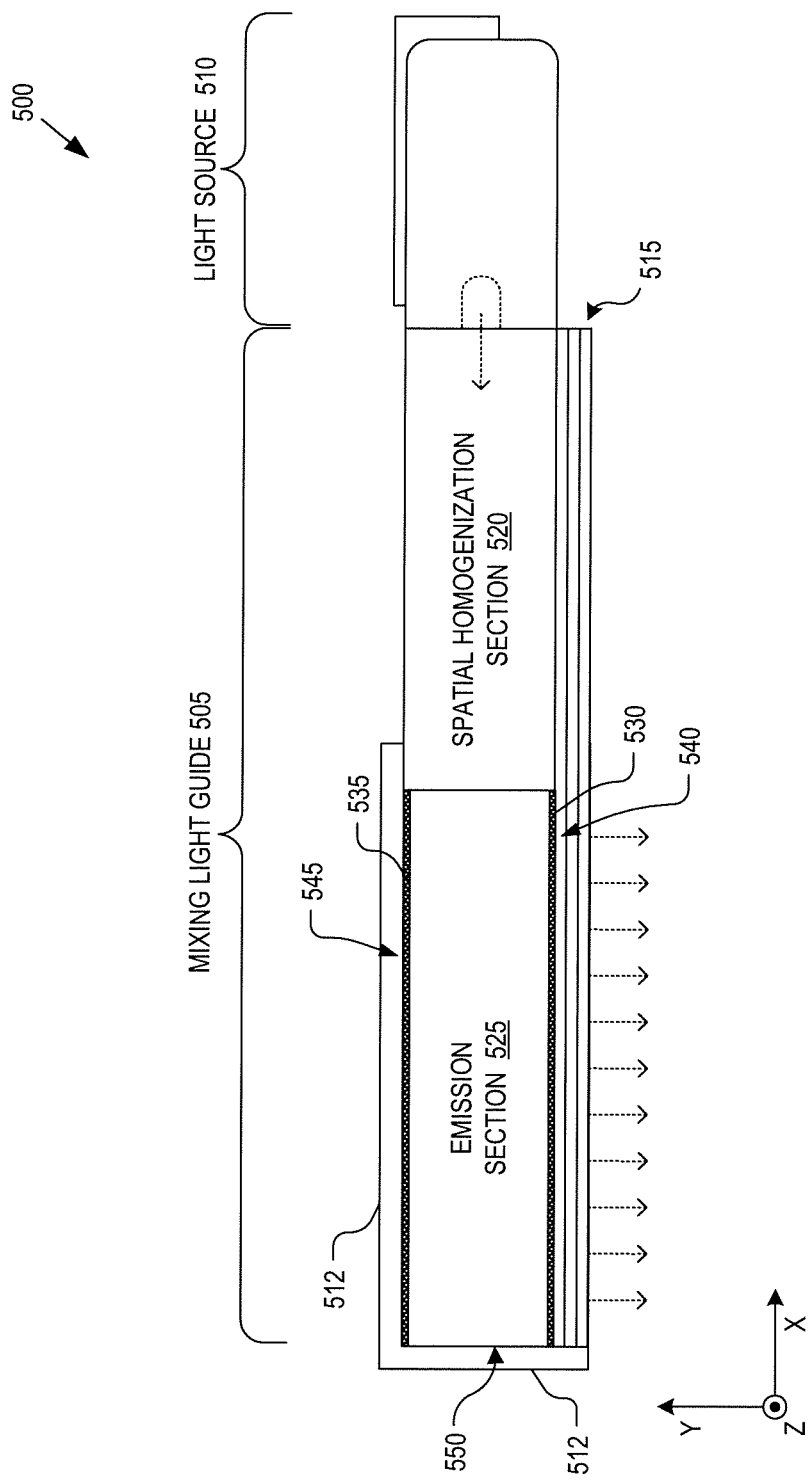
FIG. 5A is a cross-sectional side view an illumination module with a three-dimensional texture disposed in or on the emission surface of the mixing light guide, in accordance with an embodiment of the disclosure.

FIGS. 5A-D illustrate illumination modules each having a three-dimensional texture disposed in or on the emission surface of the mixing light guide, in accordance with an embodiment of the disclosure. FIG. 5A is a cross-sectional side view of an illumination module 500. The illustrated embodiment of illumination module 500 includes a mixing light guide 505, a light source 510, reflective surfaces 512, and light enhancement sandwich structure 515. Mixing light guide 505 includes a spatial homogenization section 520 and an emission section 525.

Illumination module 500 is similar to illumination module 200 with at least the following exceptions. Illumination module 500 includes patterns disposed over emission section 525 implemented as three-dimensional ("3D") textures 530 and 535 formed in or on emission surface 540 and on top surface 545, respectively. Furthermore, reflective surfaces 512 are disposed over top surface 545, end surface 550, and edge surfaces 555 and 560 (see FIGS. 5B-5D). Reflective surfaces 512 may be implemented as a reflective coating (e.g., silver paint, etc.) or a four sided reflective housing (e.g., metal housing). In some embodiments, one or more of the reflective surfaces 512 overlaying end surface 550 or edge surfaces 555, 560 may be omitted. In some embodiments, both emission surface 540 and top surface 545 need not be overlaid with a 3D texture; rather, just one of the two surfaces (either top surface 545 or emission surface 540) may be textured. Furthermore, 3D textures 530 and 535 need not have identical patterns, though in some embodiments they can be.

Figure 5B:
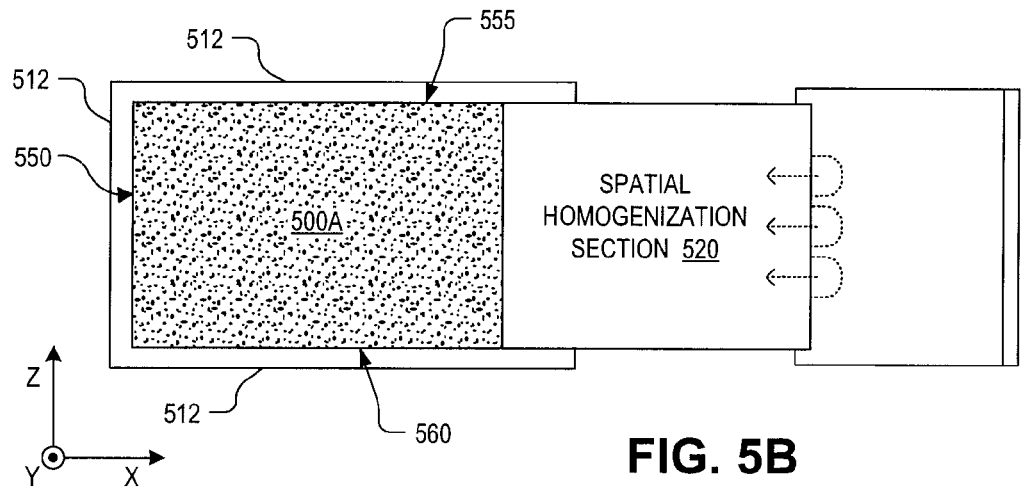
FIG. 5B is a bottom view of an illumination module with a three-dimensional texture having a uniform pattern disposed in or on the emission surface of the mixing light guide, in accordance with an embodiment of the disclosure.

FIG. 5B is a bottom view of illumination module 500 with a 3D texture 500A having a uniform pattern, in accordance with an embodiment of the disclosure. 3D texture 500A may be used to implement one or both of 3D textures 530 and 535 illustrated in FIG. 5A. 3D texture 500A is a uniformly random pattern, which may be implemented as a rough texture that is impressed or molded into the emission surface 540 and/or top surface 545. Alternatively, 3D texture 500A may be implemented using paint dots formed (e.g., silk screened) onto the given surface. The surface texture serves to scatter incident light, thereby altering the angle of incidence and affecting TIR at emission surface 540. In one embodiment, 3D texture 500A is fabricated of reflective scattering elements (e.g., silver paint dots, patterned & reflowed metal, etc.).

FIG. 5B is a bottom view of illumination module 500 with a 3D texture 500B having a non-uniform pattern, in accordance with an embodiment of the disclosure. 3D texture 500B may be fabricated in similar manner to 3D texture 500A; however, the pattern of 3D texture 500B has an increasing density of scattering elements in the corners of emission surface 540 relative to the middle. The increasing density of scattering elements in the corners offsets the lower light lamp intensity in the corners to achieve a more uniform intensity profile 310 (see FIG. 3) emitted from emission surface 540.

Figure 5C:
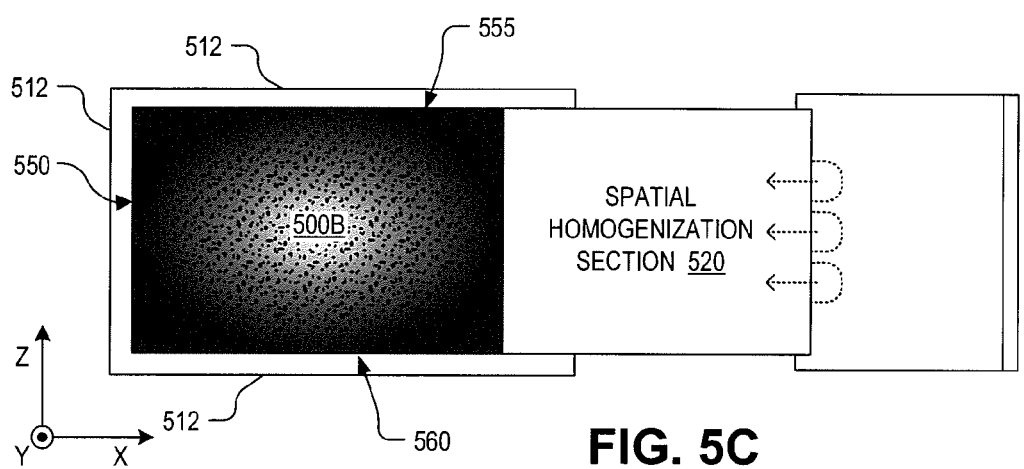
FIG. 5C is a bottom view of an illumination module with a three-dimensional texture having a non-uniform pattern disposed in or on the emission region of the mixing light guide, in accordance with an embodiment of the disclosure.
Figure 5D:
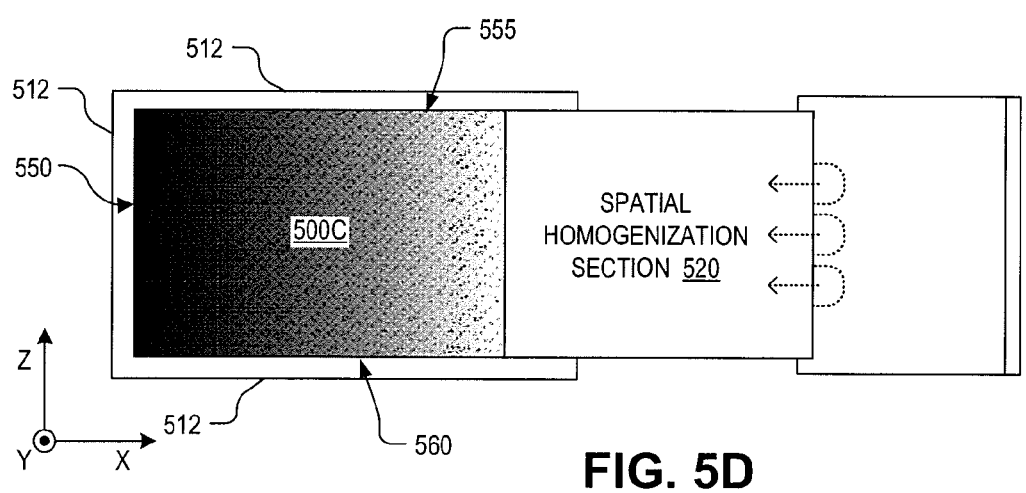
FIG. 5D is bottom view of an illumination module with a three-dimensional texture having a non-uniform pattern disposed in or on the emission region of the mixing light guide, in accordance with an embodiment of the disclosure.

FIG. 5C is a bottom view of illumination module 500 with a 3D texture 500C having a non-uniform pattern, in accordance with an embodiment of the disclosure. 3D texture 500C may be fabricated in similar manner to 3D texture 500A; however, the pattern of 3D texture 500C has an increasing density of scattering elements with increasing distance from spatial homogenization section 520. The increasing density of scattering elements moving towards end surface 550 offsets the lower light lamp intensity as light is released from emission surface 540 along its journey through emission section 525. The non-uniform pattern of 3D texture 500C improves the uniformity of intensity profile 310 (see FIG. 3) emitted from emission surface 540.

In one embodiment, one or both of 3D textures 530 and 535 may be fabricated using a composite pattern having generally increasing density of scattering elements in the corners (e.g., 3D texture 500B) and generally increasing density of scattering elements with increasing distance form spatial homogenization section 520 (e.g., 3D texture 500C).

Figure 6:
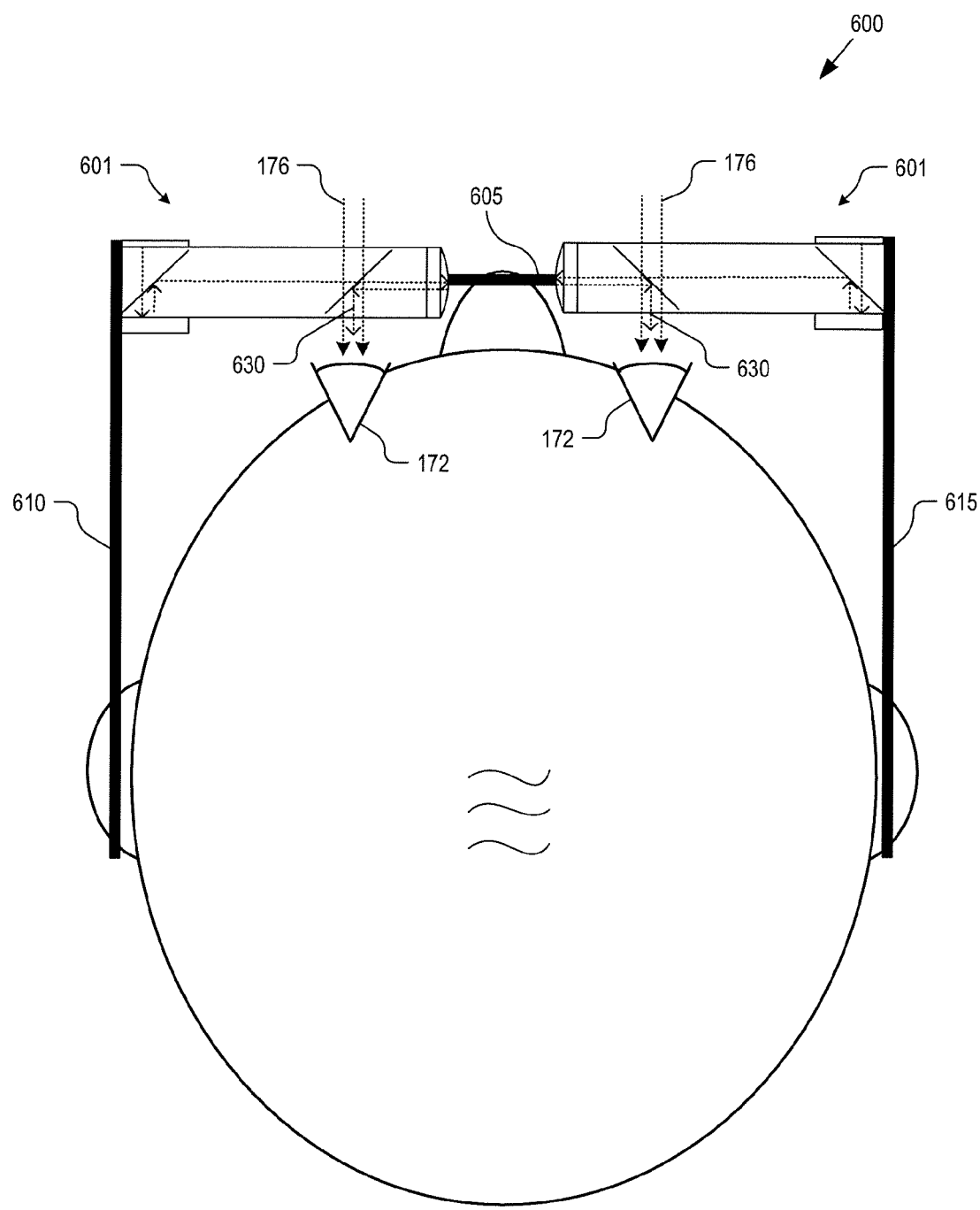
FIG. 6 is a top view of a binocular HMD implemented with near-to-eye displays, in accordance with an embodiment of the disclosure.

FIG. 6 is a top view of a head mounted display ("HMD") 600 using a pair of near-to-eye displays 601, in accordance with an embodiment of the disclosure. Each near-to-eye display 601 may be implemented with embodiments of near-to-eye display 100. The near-to-eye displays 601 are mounted to a frame assembly, which includes a nose bridge 605, left ear arm 610, and right ear arm 615. Although FIG. 6 illustrates a binocular embodiment, HMD 600 may also be implemented as a monocular HMD with only a single near-to-eye display 601.

The two near-to-eye displays 601 are secured into an eyeglass arrangement that can be worn on the head of a user. The left and right ear arms 610 and 615 rest over the user's ears while nose assembly 605 rests over the user's nose. The frame assembly is shaped and sized to position an eyepiece 115 in front of a corresponding eye 173 of the user. Of course, other frame assemblies having other shapes may be used (e.g., a visor with ear arms and a nose bridge support, a single contiguous headset member, a headband, goggles type eyewear, etc.).

The illustrated embodiment of HMD 600 is capable of displaying an augmented reality to the user. The viewing region of each eyepiece 115 permits the user to see a real world image via external scene light 176. Left and right (binocular embodiment) CGI light 630 may be generated by one or two CGI engines (not illustrated) coupled to a respective image source. CGI light 630 is seen by the user as virtual images superimposed over the real world as an augmented reality. In some embodiments, external scene light 176 may be blocked or selectively blocked to provide a head mounted virtual reality display or heads up display.

Although illumination module 120 is discussed above in the context of HMDs, it should be appreciated that it may also be applicable for use in other compact devices, such as cell phones, laptops, or other portable display devices.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for a head mounted display, the apparatus comprising:
    a light source to output lamp light; and
    a mixing light guide having a substantially rectangular cross-section, the mixing light guide including:
        a spatial homogenization section having a first end and a second end, the first end coupled to receive the lamp light having a first cross-section profile from the light source and to deliver the lamp light at the second end with a second cross-section profile substantially conforming to the substantially rectangular cross-section of the mixing light guide; and
        an emission section adjacent to the second end of the spatial homogenization section, the emission section including an emission surface through which the lamp light is emitted with a substantially uniform intensity profile, wherein the emission surface faces a different direction than an input surface of the first end through which the lamp light is received into the mixing light guide.

2. The apparatus of claim 1, wherein the spatial homogenization section and the emission section comprises a single, continuous waveguide structure.

3. The apparatus of claim 1, wherein the emission section of the mixing light guide is at least partially defined by a pattern disposed on a top surface of the mixing light guide opposite the emission surface.

4. The apparatus of claim 3, wherein the emission section of the mixing light guide is further defined by the pattern being disposed on two edge surfaces of the mixing light guide being opposite to each other and substantially perpendicular to the emission surface and the substantially rectangular cross-section.

5. The apparatus of claim 4, wherein the emission section of the mixing light guide is further defined by the pattern being disposed on an end surface of the mixing light guide being substantially perpendicular to the two edge surfaces and the emission surface.

6. The apparatus of claim 5, wherein the pattern comprises a reflective coating with light scattering properties.

7. The apparatus of claim 6, wherein the reflective coating with light scattering properties comprises diffusive white paint.

8. The apparatus of claim 3, wherein the pattern comprises a first pattern, the apparatus further comprising:
    a second pattern disposed upon the emission surface.

9. The apparatus of claim 8, wherein the first and second patterns comprise the same pattern.

10. The apparatus of claim 8, wherein the first and second patterns comprise three dimensional textures disposed in or on the top and emission surfaces of the mixing light guide.

11. The apparatus of claim 10, wherein the three dimensional textures comprise paint dots disposed on the top and emission surfaces of the mixing light guide.

12. The apparatus of claim 8, further comprising:
    reflective surfaces disposed over the top surface, two side surfaces, and an end surface of the emission section of the mixing light guide.

13. The apparatus of claim 12, wherein the reflective surfaces comprise surfaces of a four sided reflective housing disposed over the emission section of the mixing light guide.

14. The apparatus of claim 8, wherein the second pattern comprises a uniformly random pattern of reflective scattering elements.

15. The apparatus of claim 8, wherein the second pattern comprises a non-uniform pattern of reflective scattering elements, wherein a density of the reflective scattering elements generally increases with increasing distance from the spatial homogenization section.

16. The apparatus of claim 15, wherein the density of the reflective scattering elements generally increases in corners of the emission surface.

17. The apparatus of claim 1, further comprising a light enhancement sandwich structure disposed over the emission surface of the emission section, the light enhancement sandwich structure comprising:
    a first brightness enhancement film that reduces divergence of the lamp light emitted out the emission surface along a first dimension;
    a second brightness enhancement film that reduce divergence of the lamp light emitted out the emission surface along a second dimension substantially orthogonal to the first dimension; and a reflective polarizing layer to at least partially polarize the lamp light emitted out the emission surface.

18. The apparatus of claim 1, further comprising:
a display panel to modulate image data onto the lamp light to emit a computer generated image ("CGI"), wherein the display panel is positioned to be illuminated by the lamp light with the substantially uniform intensity profile.

19. The apparatus of claim 18, wherein the light source comprises three light emitting diodes each for outputting a different color.

20. The apparatus of claim 18, wherein the light source comprises a single white light source, the apparatus further comprising:
a color filter array disposed over the display panel.

21. A head mounted display, comprising:
an eyepiece to emit a computer generated image ("CGI") out an eye-ward side of the eyepiece; and
a display module to generate the CGI, the display module including a display panel to modulate image data onto lamp light to generate the CGI and an illumination module mounted to substantially uniformly illuminate the display panel with the lamp light, the illumination module including:
a light source to output the lamp light; and
a mixing light guide having a substantially rectangular cross-section, the mixing light guide including:
a spatial homogenization section having a first end and a second end, the first end coupled to receive the lamp light with a first cross-section profile from the light source and to deliver the lamp light at the second end having a second cross-section profile substantially conforming to the substantially rectangular cross-section of the mixing light guide; and
an emission section adjacent to the second end of the spatial homogenization section and sharing the substantially rectangular cross-section with the spatial homogenization section, the emission section including an emission surface through which the lamp light is emitted with a substantially uniform intensity profile, wherein the emission surface faces a different direction than an input surface of the first end through which the lamp light is received into the mixing light guide.

22. The head mounted display of claim 21, further comprising:
a light relay coupled between the display module and the eyepiece to transport the CGI light to the eyepiece.

23. The head mounted display of claim 22, wherein the eyepiece comprises a see-through eyepiece including an angled out-coupling beam splitter.

24. The head mounted display of claim 23, further comprising:

an in-coupling beam splitter disposed within the display module;
a half-wave plate polarization rotator disposed within the light relay;
a collimating end reflector disposed at a distal end of the eyepiece opposite the display module; and
a quarter-wave plate polarization rotator disposed between the out-coupling beam splitter and the in-coupling beam splitter,
wherein the out-coupling beam splitter and the in-coupling beam splitter comprise polarizing beam splitters,
wherein the display panel is disposed on an opposite side of the display module as the illumination module with the in-coupling beam splitter disposed there between.

25. The head mounted display of claim 21, wherein the emission section of the mixing light guide is defined by a reflective coating with light scattering properties disposed on a top surface opposite the emission surface, two edge surfaces, and an end surface of the mixing light guide.

26. The head mounted display of claim 21, wherein the emission section of the mixing light guide is at least partially defined by a first pattern disposed in or on a top surface of the mixing light guide opposite the emission surface and a second pattern disposed in or on the emission surface,
wherein the first and second patterns comprise three dimensional textures disposed in or on the top and emission surfaces of the mixing light guide.

27. The head mounted display of claim 26, further comprising:
reflective surfaces disposed over the top surface, two edge surfaces, and an end surface of the emission section of the mixing light guide.

28. The head mounted display of claim 26, wherein the second pattern comprises a non-uniform pattern of reflective scattering elements, wherein a density of the reflective scattering elements generally increases with increasing distance from the spatial homogenization section and generally increases in corners of the emission surface.

29. The head mounted display of claim 21, further comprising a light enhancement sandwich structure disposed over the emission surface of the emission section, the light enhancement sandwich structure comprising:
a first brightness enhancement film that reduces divergence of the lamp light emitted out the emission surface along a first dimension;
a second brightness enhancement film that reduce divergence of the lamp light emitted out the emission surface along a second dimension substantially orthogonal to the first dimension; and
a reflective polarizing layer to at least partially polarize the lamp light emitted out the emission surface.

* * * * *